United States Patent
Nozaki (10) Patent No.: US 6,438,949 B1
(45) Date of Patent: Aug. 27, 2002

(54) COVER MEMBER ATTACHMENT STRUCTURE

(75) Inventor: Naoki Nozaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,286

(22) Filed: Oct. 25, 2000

(30) Foreign Application Priority Data

Oct. 25, 1999 (JP) .......................................... 11-303055

(51) Int. Cl.⁷ ................................................. F01N 7/10
(52) U.S. Cl. ............................. 60/322; 60/272; 60/320; 60/323; 60/312; 138/110; 123/184.21; 123/195 C; 180/309; 181/243; 181/207
(58) Field of Search .......................... 60/322, 323, 320, 60/272, 282, 312, 313; 138/110, 99; 123/184.21, 195 C; 296/316.1, 316.2, 316.3, 316.7; 180/309; 181/207, 208, 243, 282

(56) References Cited

U.S. PATENT DOCUMENTS

| | | | |
|---|---|---|---|
| 3,237,716 A | * 3/1966 | Parsons ........................ | 181/72 |
| 3,677,365 A | * 7/1972 | Wright et al. ................. | 181/72 |
| 3,863,445 A | * 2/1975 | Heath ........................... | 60/299 |
| 3,946,764 A | * 3/1976 | Hubbell, III ................ | 138/148 |
| 3,977,486 A | * 8/1976 | Kleinschmit ................. | 248/60 |
| 4,031,700 A | * 6/1977 | Yamazaki et al. ............. | 60/322 |
| 4,085,816 A | * 4/1978 | Amagai et al. ........... | 180/64 A |
| 4,266,725 A | * 5/1981 | Schweikl et al. ....... | 239/265.19 |
| 4,349,078 A | * 9/1982 | Shimada et al. ........... | 180/69.1 |
| 5,464,952 A | * 11/1995 | Shah et al. .................. | 181/211 |
| 5,649,510 A | * 7/1997 | Linze ..................... | 123/198 E |
| 5,680,757 A | * 10/1997 | Pirchl .......................... | 60/299 |
| 5,844,177 A | * 12/1998 | Pirchl ......................... | 181/211 |
| 5,966,933 A | * 10/1999 | Ishihara et al. ................ | 60/322 |
| 6,058,702 A | * 5/2000 | Jorg Alexnat et al. ........ | 60/299 |
| 6,141,958 A | * 11/2000 | Voss ............................ | 60/272 |
| 6,302,466 B1 | * 10/2001 | Zwick ....................... | 296/39.3 |

FOREIGN PATENT DOCUMENTS

JP          B2226045         6/1990

* cited by examiner

*Primary Examiner*—Thomas Denion
*Assistant Examiner*—Binh Tran
(74) *Attorney, Agent, or Firm*—Birch, Stewart, Kolasch & Birch, LLP

(57) ABSTRACT

Heat shielding panels are attached to exhaust pipes and a silencer by using small set springs and large set springs. Distortion on a heat shielded panel, which would be caused when attaching a heat shielding panel through welding, is not caused. A process for positioning a bracket, which would be required when welding a bracket to an exhaust pipe, can be omitted. Moreover, as no bolt and nut is used, the number of parts can be reduced. As a result, productivity can be improved and an increase in the cost can be suppressed.

16 Claims, 6 Drawing Sheets

COVER MEMBER ATTACHMENT STRUCTURE

BACKGROUND OF THE INVENTION

1. Field of the invention

The present invention relates to a cover member attachment structure for reducing the number of parts through elimination of a welding step and so on.

2. Description of Background Arts

An example of cover members, which cover the respective sections of a vehicle, is a heat shielding panel to be attached to an exhaust pipe or a silencer, which communicates with an engine. Known examples of a heat shielding panel attachment structure include, for example, (1) "a motorcycle exhaust pipe device" disclosed in Japanese Patent Publication No. Hei 2-26045, and (2) a structure for attaching a heat shielding panel to a bracket using a screw, the bracket being attached to an exhaust pipe.

The art (1) discloses, as shown in FIG. 5 of the publication, an exhaust pipe device, in which the external circumferential surface of a single pipe 11 is clamped by a first band $16_1$, which is attached to a heat shielding panel 15 via a spacing panel 17, and a second band $16_2$, which communicates with the first band $16_1$. The respective ends of the first band $16_1$ and the second band $16_2$ are attached, using a bolt 22 and a nut 23, to a positioning projected piece 24, projecting from the external circumferential surface of the single pipe 11, whereby the heat shielding panel 15 is attached to the single pipe 11.

Figure 8:
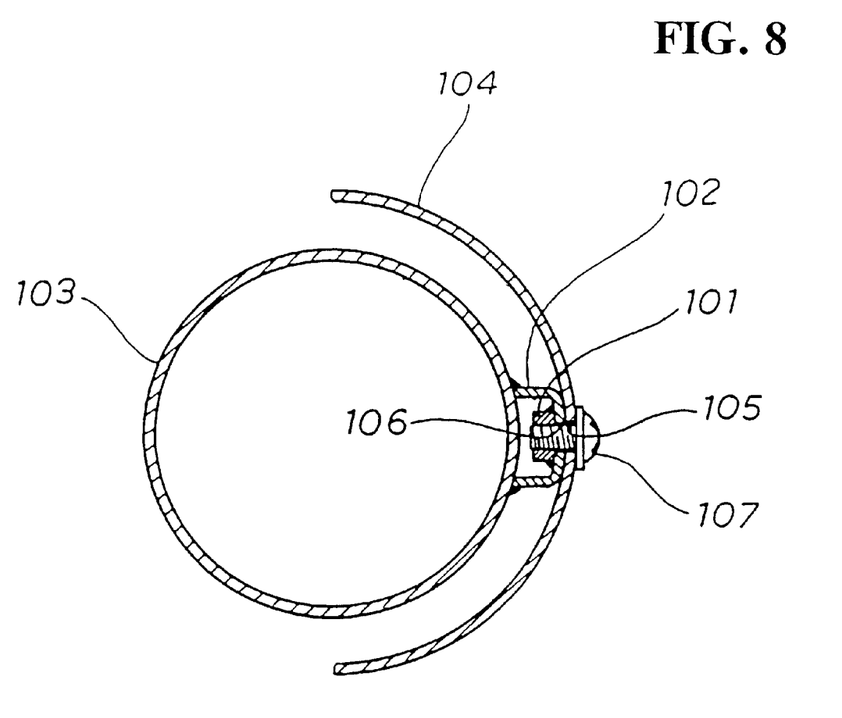
FIG. 8 is a cross-sectional view explaining a conventional cover member attachment structure.

The above mentioned art (2) will be described referring to FIG. 8 which is a cross-sectional view explaining a conventional cover member attachment structure, showing a state in which a bracket 102, having an inverted C-shaped cross section and a nut 101 welded on the inner surface thereof, is welded on the external circumferential surface of the exhaust pipe 103. A screw 107 is inserted through an attachment hole 105, formed on a heat shielding panel 104, which serves as a cover member. A piercing hole 106 is formed on the bracket 102 and then screwed into the nut 101. The exhaust pipe 103 is attached to the heat shielding panel 104.

According to the art (1), as the first band 16, and the spacing panel 17, and the spacing panel 17 and the heat shielding panel 15 are respectively welded, the heat shielding panel 15 and the first band 16, may possibly be distorted due to the heat caused during the welding process. Therefore, careful welding is required for minimizing the distortion.

In addition, as a bolt 22 and a nut 23 are used for securing the first band 16, and the second band $16_2$ to the single pipe 11, the number of parts is increased, resulting in a cost increase.

According to the art (2), as the nut 101 is welded so as to correspond to the piercing hole 106, and the bracket 102 is welded on a predetermined position on the exhaust pipe 103, positioning of the nut 101 and the bracket 102 is required and an increased number of welding steps must be applied. This makes it difficult to improve productivity.

SUMMARY AND OBJECTS OF THE INVENTION

In light of the above, the object of the present invention is to provide a cover member attachment structure for improving productivity through the elimination of a welding step and so on. In addition, an object of the present invention is to reduce the number of parts and thus suppress the increase in cost through the abolishment of the use of bolts and nuts.

In order to achieve the above object, in a cover member attachment structure for attaching a cover member to an object to be shielded for the purpose of improving appearance, suppressing heat propagation, preventing solid or liquid scattering, preventing invasion to or leakage from the inside, and so on, the cover member is attached to the object to be shielded using a spring member A spring member is used in attaching a cover member to an object to be shielded, rather than through welding or using bolts and nuts.

As a result, distortion on the heat shielding panel, which would be caused when attaching a cover member through welding and so on, is not caused. In addition, a step of positioning a bracket, which would be required in welding a bracket to an object to be shielded, can be omitted. Further, as no bolt and nut is used, the number of parts can be reduced.

According to the present invention, the cover member is a member to be attached to a part of an intake and exhaust system, which communicates with an engine.

When attaching, for example, an air cleaner case cover or a heat shielding panel as a cover member to a part of an intake and exhaust system, a spring member is used.

As a result, for an air cleaner case cover, for example, vibration can be efficiently suppressed by means of elastic force of the spring member.

For a heat shielding panel, when a spring member is made detachable, should the spring member be worn out due to heat, the spring member can be easily exchanged.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
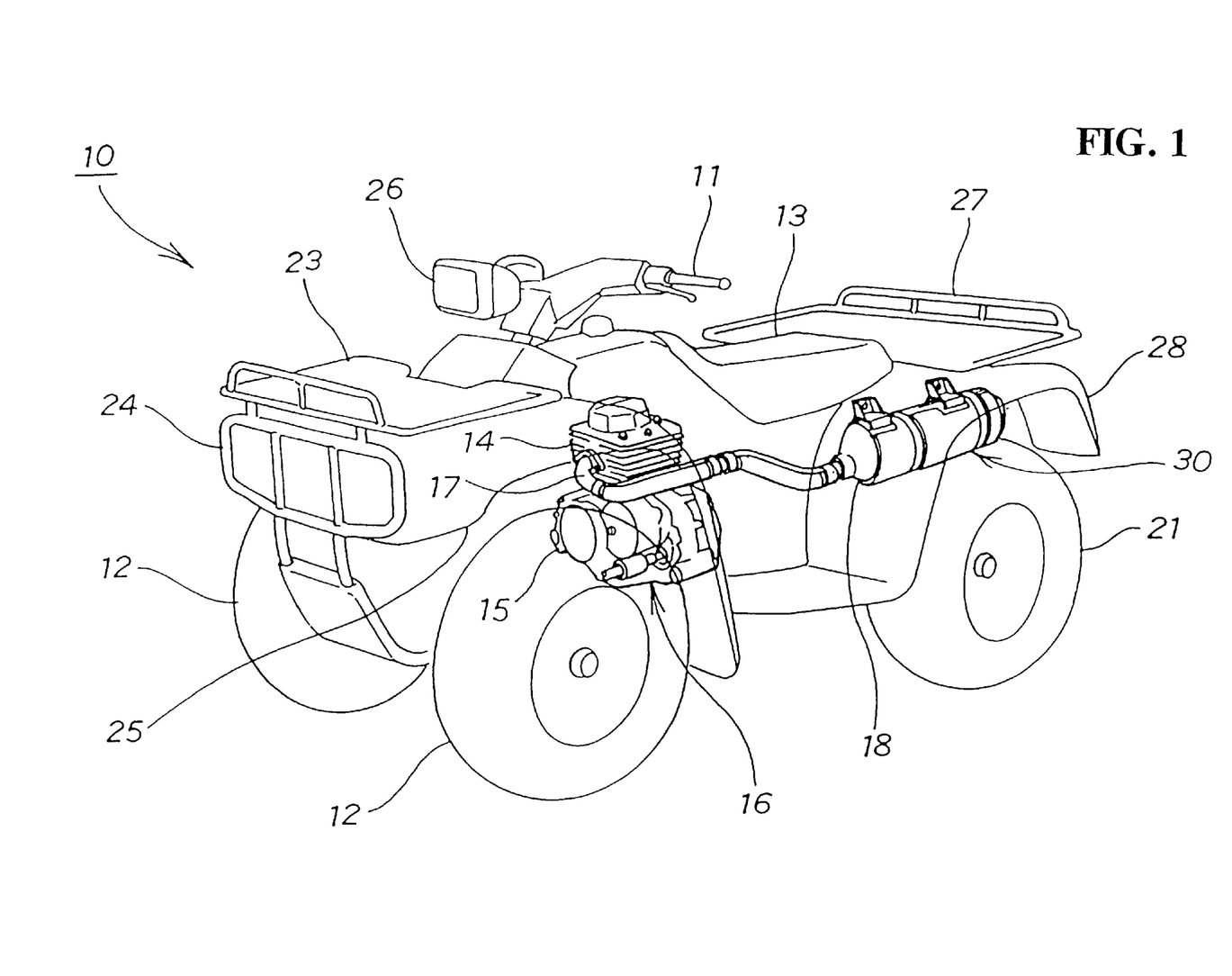
FIG. 1 is a perspective view showing an all-terrain vehicle employing a cover member attachment structure of the present invention.

A preferred embodiment of the present invention will be described based on the accompanying drawings wherein FIG. 1 is a perspective view showing an all-terrain vehicle employing a cover member attachment structure of the present invention.

An all-terrain vehicle 10 comprises a handle 11 rotatably attached to a vehicle body frame (not shown), front wheels 12, 12 steerably connected to the handle 11 via a steering mechanism (not shown). The handle is vertically movably attached to the vehicle body frame via an arm (not shown). A seat 13 is attached above the vehicle body frame, and a power unit 16 including an engine 14 is attached below the seat 13. A transmission 15 is provided together with an exhaust pipe 17 extending from the front side of the engine 14 forward and then backward. A silencer 18 is attached to the trailing part of the exhaust pipe 17. Rear wheels 21, 21 (reference numeral farther from the reader being not shown) are provided for being driven, together with the front wheels 12, 12, via a driving power transmission mechanism (not shown) by the power unit 16. Note that 23 is a front carrier, 24 is a front bumper, 25 is a front fender, 26 is a head lamp, 27 is a rear career, and 28 is a rear fender.

The above mentioned exhaust pipe 17 and a silencer 18 are objects to be shielded. The heat shielding panels are cover members (described later) attached to the exhaust pipe 17 and the silencer 18 and together constitute an exhaust device 30.

An all-terrain vehicle (ATV, all-terrain vehicle) 10, including, for example, a buggy, can turn in a small space and be easily operated due to its light and compact vehicle body, and is an off-road vehicle suitable for use in moving in agriculture, cattle breeding, hunting, safeguarding, leisure, and so on.

Figure 2:
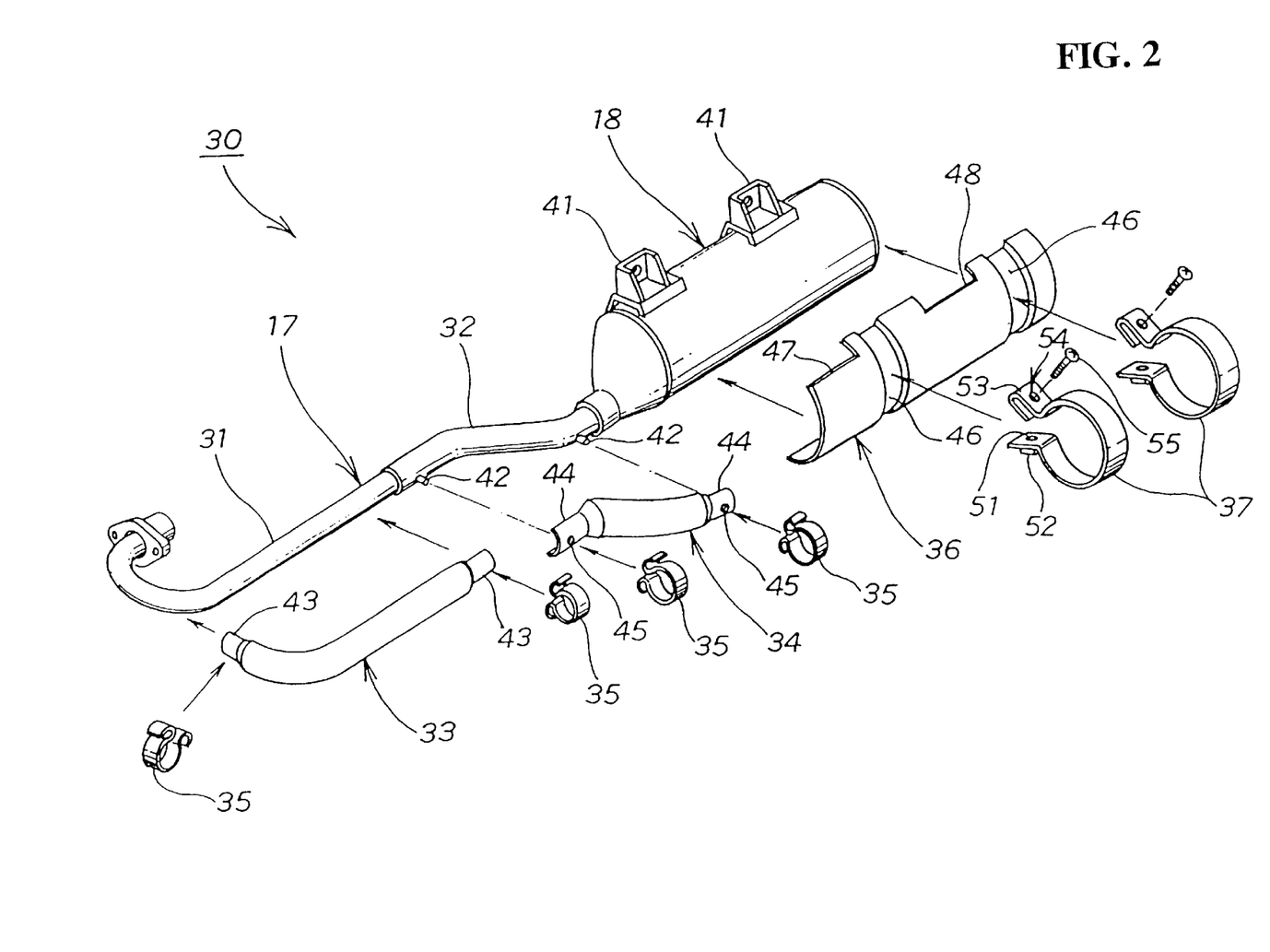
FIG. 2 is an exploded perspective view showing an exhaust device having a cover member attachment structure of the present invention.

FIG. 2 is an exploded perspective view showing an exhaust device having a cover member attachment structure of the present invention. The exhaust device 30 comprises an exhaust pipe 17 including a front exhaust pipe 31 having a J shape to be attached on the engine side. A rear exhaust pipe 32 is connected to the trailing part of the front exhaust pipe 31. A silencer 18 is connected to the rear exhaust pipe 32, a front heat shielding panel 33 is provided for preventing heat propagation to the side of the front exhaust pipe 31. A rear heat shielding panel 34 is provided for preventing heat propagation to the side of the rear exhaust pipe 32. Small set springs 35 are provided as spring members for attaching the front and rear heat shielding panels 33, 34 to the front and rear exhaust pipes 31, 32, respectively. A silencer heat shielding panel 36 is provided for preventing heat propagation to the side of the silencer 18. Large set springs 37, 37 are formed as spring members for attaching the silencer heat shielding panel 36 to the silencer 18.

The silencer 18 has vehicle body attaching parts 41, 41 provide attachments to the vehicle body frame (not shown).

The rear exhaust pipe 32 has projections 42, 42 formed on the sides of the front and trailing ends thereof, respectively.

The front heat shielding panel 33 is formed by halving in the longitudinal direction a cylinder having a larger inner diameter than the outer diameter of the front exhaust pipe 31, bending the halved cylinder along the shape of the side of the front exhaust pipe 31, and forming clamped parts 43, 43 at the both ends of the cylinder for abutting on the external circumferential surface of the front exhaust pipe 31.

The rear heat shielding panel 34 is formed by halving in the longitudinal direction a cylinder having a larger inner diameter than the outer diameter of the rear exhaust pipe 32, bending the halved cylinder along the shape of the side of the rear exhaust pipe 32, forming clamped parts 44, 44 at the two ends of the cylinder for abutting on the external circumferential surface of the rear exhaust pipe 32, and forming positioning holes 45, 45 on the clamped parts 44, 44 to receive the projections 42, 42 of the rear exhaust pipe 32. With the projections 42, 42 fitting to the positioning holes 45, 45, the rear heat shielding panel 34 is prevented from moving in the circumferential and longitudinal direction of the rear exhaust pipe 32.

A small set spring 35 is a spring member formed by bending a panel so as to have a cross sectional view of a substantial Ω shape, for elastically clamping the front exhaust pipe 31 via the clamped parts 43, 43 of the front heat shielding panel 33 to thereby attach the front heat shielding panel 33 to the front exhaust pipe 31, and for elastically clamping the rear exhaust pipe 32 via the clamped parts 44, 44 of the rear heat shielding panel 34 to thereby attach the rear heat shielding panel 34 to the rear exhaust pipe 32.

The silencer heat shielding panel 36 is formed by halving in the longitudinal direction of a cylinder having a larger inner diameter than the outer diameter of the silencer 18, forming clamped parts 46, 46 at the middle parts thereof in the longitudinal direction for abutting on the external circumferential surface of the silencer 18, and forming notches 47, 48 for preventing interference with the vehicle body attaching parts 41, 41 of the silencer 18.

A large set spring 37 is a spring member formed by bending a panel into a substantially key-hole shape when viewed from the side, having a structure in which a screw piercing hole 51 is formed and a nut 52 is fixed on one end thereof, the other end thereof is worn out so as to form a return part 53, where a screw piercing hole 54 is formed, and a screw 55 is inserted through the two screw piercing holes 51, 54 and then screwed into the nut 52. A large set spring 37 is a member for elastically clamping the silencer 18 via the clamped parts 46, 46 of the silencer heat shielding panel 36 and for further clamping the silencer 18 by using a screw whereby the silencer heat shielding panel 36 is attached to the silencer 18.

In the front exhaust pipe 31 described above, the front heat shielding panel 33 does not move in the circumferential or longitudinal direction with respect to the front exhaust pipe 31 as the clamped parts 43, 43 of the front heat shielding panel 33 are clamped for attachment from different directions (front and sides) by the small set springs 35, 35. However, in the rear exhaust pipe 32, as the clamped parts 44, 44 of the rear heat shielding panel 34 are clamped for attachment from substantially the same direction (the side) by the small set springs 35, 35, with this only, the rear heat shielding panel 34 may move with respect to the rear exhaust pipe 32 due to vibration.

The position of the rear heat shielding panel 34 with respect to the rear exhaust pipe 32 is determined such that the projections 42, 42 of the rear exhaust pipe 32 and the positioning holes 45, 45 of the rear heat shielding panel 34 are fitted to each other.

Figure 3:
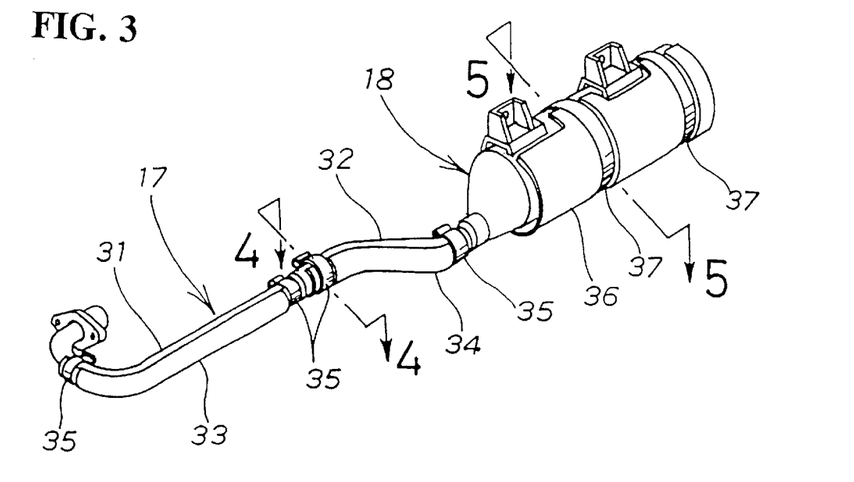
FIG. 3 is a perspective view showing an exhaust device having a cover member attachment structure of the present invention.

FIG. 3 is a perspective view showing an exhaust device having a cover member attachment structure of the present invention, showing a state in which the front heat shielding panel 33 and the rear heat shielding panel 34 are attached to the front exhaust pipe 31 and the rear exhaust pipe 32,.respectively, by using the small set springs 35, and the silencer heat shielding panel 36 is attached to the silencer 18 by using the large set springs 37, 37.

Figure 4:
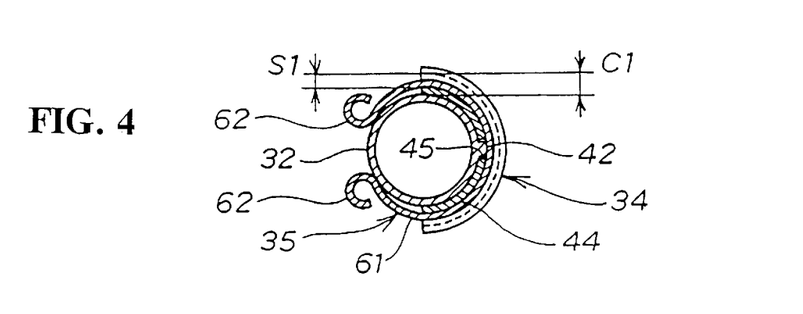
FIG. 4 is a cross-sectional view of FIG. 3 along the line 4—4.

FIG. 4 is a cross-sectional view of FIG. 3 along the line 4—4, showing a state in which the clamped part 44 of the rear heat shielding panel 34, which is formed in a shape similar to that of the external circumferential surface of the rear exhaust pipe 32, is placed on the external circumferential surface of the rear exhaust pipe 32 such that the projections 42 of the rear exhaust pipe 32 are fitted to the respective positioning holes 45 of the rear heat shielding panel 34, and the clamped parts 44 are pressed onto the rear exhaust pipe 32 by means of the reduced elastic force applied by the small set spring 35. Note that SI is a step difference between the clamped part 44 and the remaining part, or a part excluding the clamped part 44, of the rear heat shielding panel 34, Cl is a distance between the external circumferential surface of the rear exhaust pipe 32 and the inner surface of the part excluding the clamped part 44 of the rear heat shielding panel 34, i.e., the maximum clearance between the rear exhaust pipe 32 and the rear heat shielding panel 34.

A small set spring 35 comprises, in detail, a large C-shaped arc section 61 and small C-shaped arc sections 62, 62, each being continuous to each end of the large arc section 61. With the space between the small arc sections 62, 62 being used as an opening, the opening can be smoothly widened so that the small set spring 35 can be easily fitted onto the clamped part 44 of the rear heat shielding panel 34.

A small set spring 35 is used with respect to the rear exhaust pipe 32 having a smaller diameter, as described above, because a small set spring 35 having a smaller diameter can generate a relatively large elastic force, i.e., a spring with a relatively large spring constant can be manufactured. By using a spring with a relatively large spring constant, the rear heat shielding panel 34 can be secured to the rear exhaust pipe 32 by a sufficient elastic force caused by only the small set spring 35.

The cross section of the front exhaust pipe 31, the front heat shielding panel 33, and the small set spring 35 being assembled together, as shown in FIG. 3, is identical to that which is shown in FIG. 4, except for the projection 42 and the positioning hole 45, and the explanation thereof is omitted.

Figure 5:
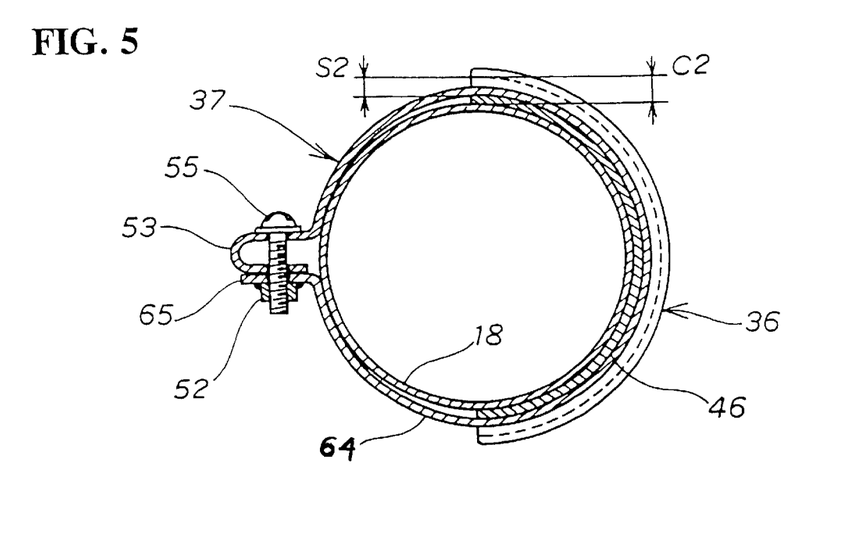
FIG. 5 is a cross-sectional view of FIG. 3 along the line 5—5.

FIG. 5 is a cross-sectional view of FIG. 3 taken along the line 5—5, showing a state in which the clamped part 46 of the silencer heat shielding panel 36, which is formed so as to have a shape similar to that of the external circumferential surface of the silencer 18, is placed on the external circumferential surface of the silencer 18, and the silencer heat shielding panel 36 is attached to the silencer 18 by the reduced elastic force applied by the large set spring 37 and the engaging force applied by the screw 55 and the nut 52. Note that S2 is a step difference between the clamped part 46 of the silencer heat shielding panel 36 and a part excluding the clamped part 46 of the silencer heat shielding panel 36, and C2 is a distance between the external circumferential surface of the silencer 18 and a part excluding the clamped part 46 of the silencer heat shielding panel 36, i.e., the maximum clearance between the silencer 18 and the silencer heat shielding panel 36.

A large set spring 37 comprises, in detail, a large C-shaped arc section 64, a return section 53, and a bending section 65, the return section 64 and the bending section 53 both being continuous to the respective ends of the large arc section 64, in which a screw piercing hole 54 (see FIG. 2) is formed piercing through the two panels of the return section 53, a screw piercing hole 51 (see FIG. 2) is formed and a nut 52 is secured on the bending section 65.

A large set spring 37 of a large diameter having a nut 52 is used with respect to the silencer 18 of a large diameter, as described above, because it is difficult for a large set spring 37 having a large diameter to cause a large elastic force. That is, it is difficult to manufacture a spring with a large spring constant. In order to compensate the elastic force, engagement between the screw 55 and the nut 52 is utilized. With the elastic force by the spring and the engaging force by the screw and the nut, the silencer heat shielding panel 36 can be secured to the silencer 18 with sufficient force.

As described above with reference to FIGS. 4 and 5, the present invention is characterized by a cover member attachment structure for attaching heat shielding panels 33, 34, 36 as cover members for the purpose of improving appearance, suppressing heat propagation, preventing solid or liquid scattering, preventing invasion to or leakage from the inside, and so on, in which the heat shielding panels 33, 34, 36 are attached to the exhaust pipes 31, 32, and the silencer 18 as objects to be shielded, by using small set springs 35 and large set springs 37.

With the above structure, distortion on a heat shielding panel, which would be caused when attaching a heat shielding panel through welding and so on, is not caused. In addition, a step of positioning a bracket, which would be required in welding a bracket to an exhaust pipe, can be omitted. As a result, productivity can be improved.

Further, as no bolt and nut is used when attaching the front and rear heat shielding panels 33, 34 to the front and rear exhaust pipes 31, 32, the number of parts can be reduced, whereby an increase in the cost can be suppressed.

Also, the present invention is characterized by the fact that a cover member is a member to be attached to a part of an intake and exhaust system, which communicates with an engine 14.

For attaching, for example, an air cleaner case cover (not shown) or heat shielding panels 33, 34, 36 as cover members to a part of an intake and exhaust system, a small set spring 35 and a large set spring 37 are used.

With the above structure, for an air cleaner case cover, for example, vibration can be efficiently suppressed by means of elastic force of the spring member. For the heat shielding panels 33, 34, 36, when a small set spring 35 and a large set spring 37 are made detachable, should the small set spring 35 and the large set spring 37 be worn out due to heat, the small set spring 35 and the large set spring 37 can be easily exchanged.

Figure 6A:
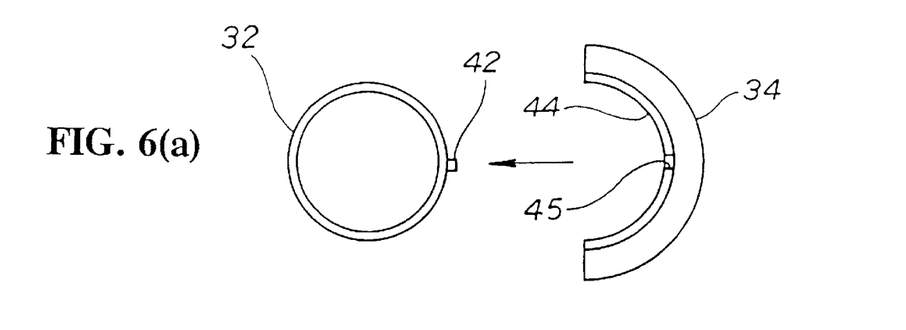
FIGS. 6(a) to 6(d) are diagrams explaining the operation of a small set spring of the present invention.
Figure 6B:
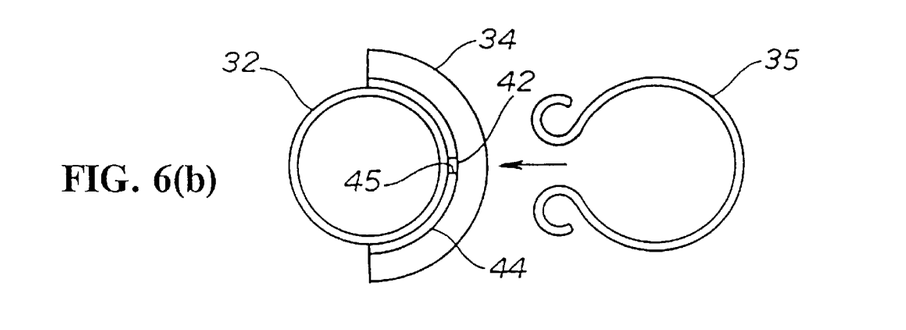

An operation of a small set spring 35 described above will next be described. FIGS. 6(a) to 6(b) are diagrams explaining operation of a small set spring according to the present invention. The operation of a small set spring according to the present invention will be described, as well as a manner of attaching the rear heat shielding panel 34 to the rear exhaust pipe 32.

To attach the rear heat shielding panel 34 to the rear exhaust pipe 32, in FIG. 6(a), the projection 42 of the rear exhaust pipe 32 is fitted to the positioning hole 45 of the rear heat shielding panel 34, and the clamped part 44 of the rear heat shielding panel 34 is placed on the external circumferential surface of the rear exhaust pipe 32.

Figure 6C:
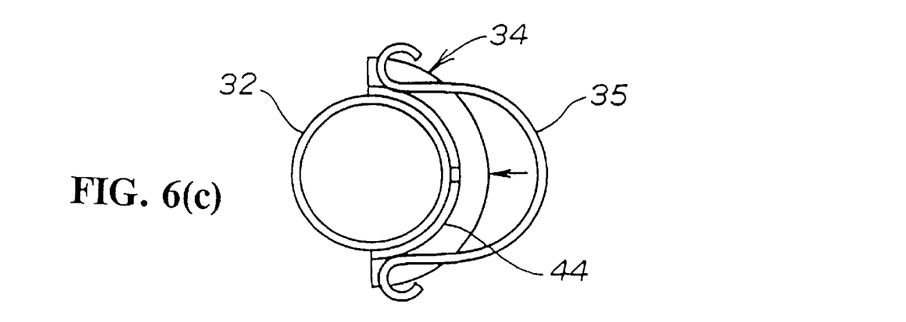
Figure 6D:
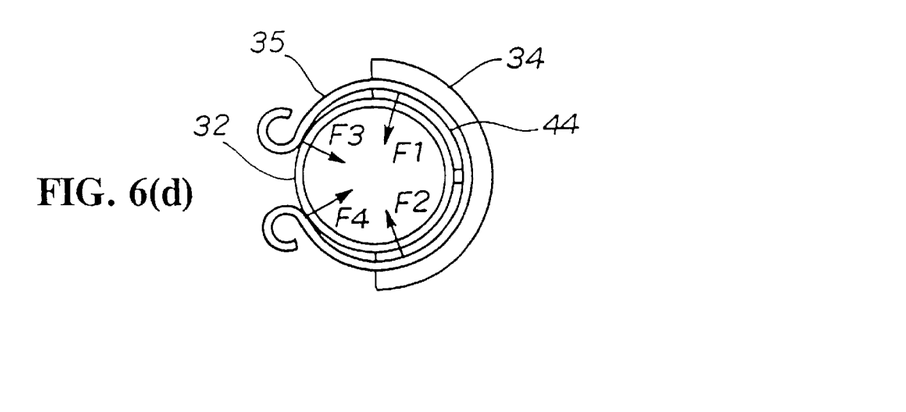

In FIG. 6(b), the opening of the small set spring 35 is pressed onto the rear heat shielding panel 34. As shown in FIG. 6(c), the small set spring 35 is pressed onto the rear heat shielding panel 34 to thereby widen the opening of the small set spring 35. Then, as shown in FIG. 6(*d*), the small set spring 35 is fitted onto the rear exhaust pipe 32 via the rear heat shielding panel 34.

At this time, the small set spring 35 applies an inward elastic force, as represented by the arrows F1, F2 in the drawing, to the rear exhaust pipe 32 and the clamped part 44, and an inward elastic force, as indicated by the arrows F3, F4, only to the rear exhaust pipe 32.

The elastic forces F1, F2 are forces pressing the clamped part 44 onto the rear exhaust pipe 32. With the elastic forces F1, F2, the clamped part 44 can be reliably stuck to and fixed on the rear exhaust pipe 32. With the elastic forces F3, F4, the rear heat shielding panel 34 can be prevented from being displaced sideways.

To remove the rear heat shielding panel 34 from the rear exhaust pipe 32, the above mentioned procedure may be followed in reverse. Then, as it is possible to remove the small set spring 35 by simply widening the opening thereof, removal of the small set spring 35, as well as attachment thereof, can be easily achieved. Therefore, the rear heat shielding panel 34 can be easily exchanged.

FIGS. 7(*a*) to 7(*e*) are diagrams explaining the operation of a large set spring according to the present invention. The operation of a large set spring according to the present invention will be described as well as the manner of attaching the silencer heat shielding panel 36 to the silencer 18.

To attach the silencer heat shielding panel 36 to the silencer 18, in FIG. 7(*a*), the clamped part 46 of the silencer heat shielding panel 36 is placed on the external circumferential surface of the silencer 18.

As shown in FIG. 7(*b*), the opening of the large set spring 37 is pressed onto the silencer 18, and, as shown in FIG. 7(*c*), the large set spring 37 is further pressed onto the silencer 18 to thereby widen the opening of the large set spring 37. Then, as shown in FIG. 7(*d*), the large set spring 37 is fitted onto the silencer 18 via the clamped part 46, and the screw 55 is inserted through the screw piercing holes 51, 54, and, as shown in FIG. 7(*e*), screwed into the nut 52.

Figure 7A:
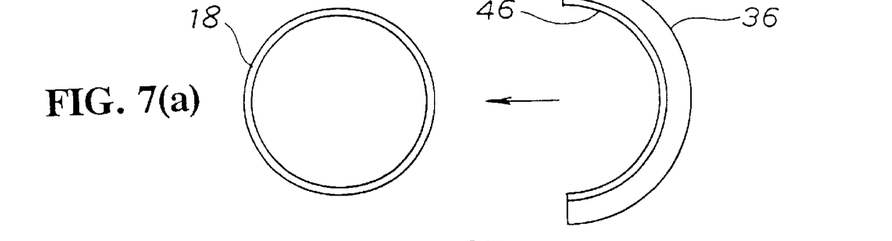
FIGS. 7(a) to 7(e) are diagrams explaining the operation of a large set spring of the present invention.
Figure 7B:
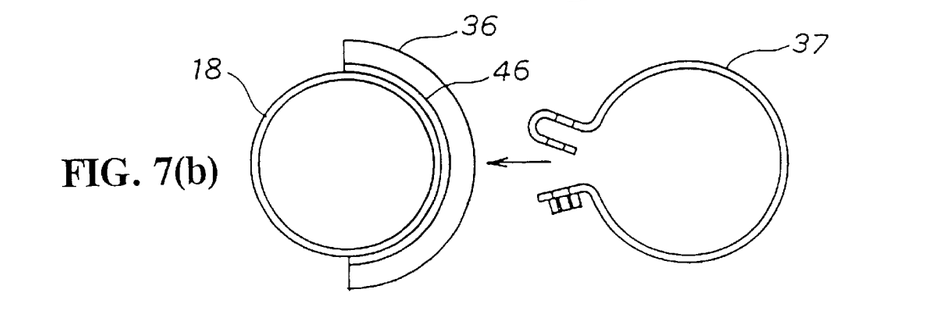
Figure 7C:
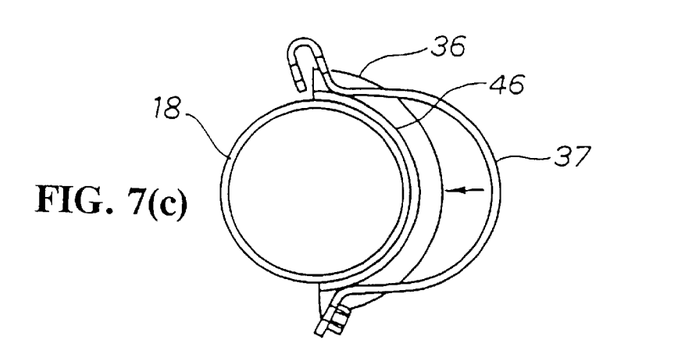
Figure 7D:
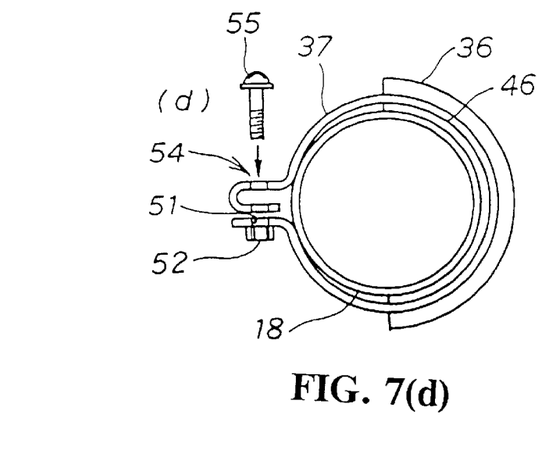
Figure 7E:
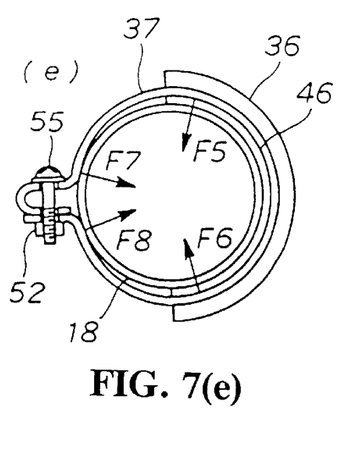

Then, the large set spring 37 applies an inward elastic force, represented by the arrows F5, F6, to the silencer 18 and the clamped part 46, and an inward elastic force, indicated by the arrows F7, F8, only to the silencer 18.

The elastic forces F5, F6 are forces pressing the clamped part 46 onto the silencer 18. With the elastic forces F5, F6, the clamped part 46 can be reliably stuck to and fixed on the silencer 18. With the elastic forces F7, F8, the silencer heat shielding panel 36 can be prevented from being displaced sideways.

As described above, with the elastic force by the large set spring 37 and the engaging force by the screw 55 and the nut 52, the silencer heat shielding panel 36 can be rigidly attached to the silencer 18.

To remove the silencer heat shielding panel 36 from the silencer 18, the above procedure may be followed in reverse.

Note that a spring member of the present invention is not limited to a panel type, as described in the embodiment, and may be a wire type.

Also note that a cover member of the present invention is not only a heat shielding panel as a cover member of an exhaust system and an air cleaner case cover to be attached to an air cleaner case of an intake system, but may also be, for example, in motorcycles, a front fender to be attached to a front fork, a front fork cover, a chain cover to be attached to a rear fork, a cover to be attached to a passenger's handle provided behind a seat, and a handle cover to be attached to a handle.

Further, although heat shielding panels are attached to both of an exhaust pipe and a silencer in the above embodiment, this is not an exclusive example. That is, a heat shielding panel may be attached to at least one of the exhaust pipe and the silencer or to at least one of the front exhaust pipe and the rear exhaust pipe.

The present invention having the above structure can produce the following advantage.

According to a cover member attachment structure, as a cover member is attached to an object to be shielded, by using a spring member, distortion on a cover member, which would be caused when attaching a cover member through welding and so on, is not caused. In addition, a step of positioning a bracket, which would be required in welding a bracket to an object to be shielded, can be omitted. Further, as no bolt and nut is used, the number of parts can be reduced.

According to a cover member attachment, a cover member is a member to be attached to a part of an intake and exhaust system, which communicates with an engine. Thus, for an air cleaner cover, for example, vibration can be efficiently suppressed by means of the elastic force of the spring member, and, for a heat shielding panel, when the spring member is made detachable, should the spring member become worn out due to heat, the spring member can be exchanged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cover member attachment structure for attaching a cover member to an object to be shielded for the purpose of improving appearance, suppressing heat propagation, preventing solid or liquid scattering, preventing invasion to or leakage from the inside, comprising:
   at least three spring members for elastically attaching the cover member to the object to be shielded and suppressing vibration between the cover member and the object to be shielded,
   wherein the cover member includes at least a first section, a second section, and a third section formed separately from each other, the sections being attached by the spring members serially along a length of the object to be shielded.

2. The cover member attachment structure according to claim 1, wherein at least one section of the cover member is a curvilinear member for attachment to a curvilinear part of an exhaust system, which communicates with an engine.

3. The cover member attachment structure according to claim 1, and further including a projection formed on at least one section of said cover member and said object to be shielded and an aperture is formed on at least one of said object and said section of said cover member for aligning said cover member relative to said object.

4. The cover member attachment structure according to claim 3, wherein a plurality of projections and apertures are formed on at least one section of said cover member and said object for aligning said cover member relative to said object in a predetermined position.

5. The cover member attachment structure according to claim 1, wherein said spring members are formed to have a cross section of a substantial φ shape and include a first open end and a second closed end, said open end being adapted to be elastically expanded and slid over an object to be shielded to snap fit thereon with an elastic force for retaining said cover member relative to said object.

6. The cover member attachment structure according to claim 5, wherein said spring members exert an elastic force in at least four directions for retaining said cover relative to said object.

7. The cover member attachment structure according to claim 1, wherein each of said spring members includes an open end and a closed end, said open end being adapted to be elastically expanded and slid over said object to be shielded to snap fit thereon for retaining said cover member relative to said object and further including an attaching member for securing said open end of each of said spring members together, and wherein said cover member is secured to said object by an elastic force of each of said spring members and an engaging force of said attaching member.

8. The cover member attachment structure according to claim 7, wherein said attaching member is a nut and bolt for fastening said open end of each of said spring members relative to each other.

9. A cover member attachment structure comprising:
   an object to be shielded;
   a cover member to be attached to said object to be shielded for the purpose of improving appearance, suppressing heat propagation, preventing solid or liquid scattering, preventing invasion to or leakage from the inside; and
   at least three spring members for elastically attaching the cover member to the object to be shielded and suppressing vibration between the cover member and the object to be shielded,
   wherein the cover member includes at least a first section, a second section, and a third section formed separately from each other, the sections being attached by the spring members serially along a length of the object to be shielded.

10. The cover member attachment structure according to claim 9, wherein at least one section of the cover member is a curvilinear member for attachment to a curvilinear part of an exhaust system, which communicates with an engine.

11. The cover member attachment structure according to claim 9, and further including a projection formed on at least one section of said cover member and said object to be shielded and an aperture is formed on at least one of said object and said section of said cover member for aligning said cover member relative to said object.

12. The cover member attachment structure according to claim 11, wherein a plurality of projections and apertures are formed on at least one section of said cover member and said object for aligning said cover member relative to said object in a predetermined position.

13. The cover member attachment structure according to claim 9, wherein said spring members are formed to have a cross section of a substantial Ω shape and include a first open end and a second closed end, said open end being adapted to be elastically expanded and slid over an object to be shielded to snap fit thereon with an elastic force for retaining said cover member relative to said object.

14. The cover member attachment structure according to claim 13, wherein said spring members exert an elastic force in at least four directions for retaining said cover relative to said object.

15. The cover member attachment structure according to claim 9, wherein each of said spring members includes an open end and a closed end, said open end being adapted to be elastically expanded and slid over said object to be shielded to snap fit thereon for retaining said cover member relative to said object and further including an attaching member for securing said open end of each of said spring members together, wherein said cover member is secured to said object by an elastic force of each of said spring members and an engaging force of said attaching member.

16. The cover member attachment structure according to claim 15, wherein said attaching member is a nut and bolt for fastening said open end of each of said spring members relative to each other.

* * * * *